United States Patent Office 2,911,378
Patented Nov. 3, 1959

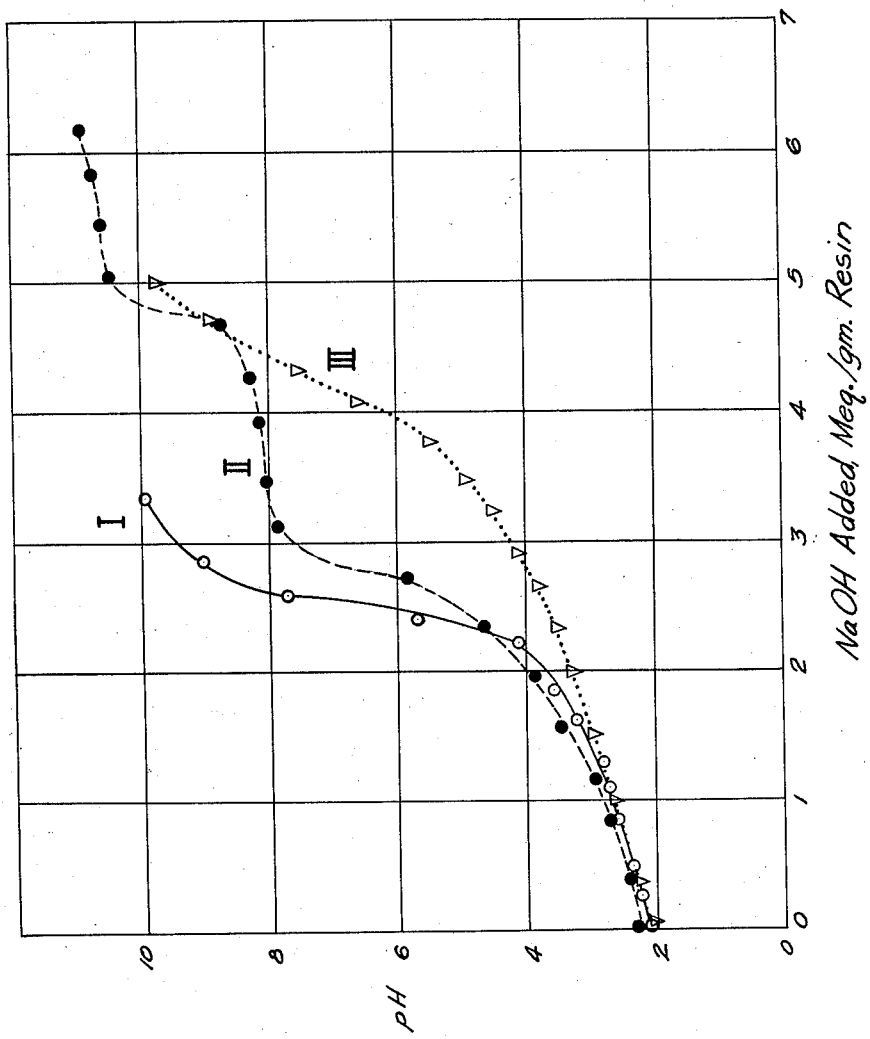

2,911,378

WATER INSOLUBLE PHOSPHONIC ACID POLYMERIZATES OF POLYVINYLARYL COMPOUNDS

Jacob I. Bregman, Chicago, Ill., assignor to National Aluminate Corporation, Chicago, Ill., a corporation of Delaware Application January 2, 1952, Serial No. 264,597

8 Claims. (Cl. 260—2.2)

This invention relates to water insoluble phosphonous and phosphonic polymerizates of polyvinylaryl compounds and to a method for the production of such polymerizates. The invention also relates to the employment of such polymerizates for the removal of cations from liquid media, especially aqueous media, and more particularly to the selective removal of sodium ions over potassium ions where both types of ions are present in the same media.

Various types of polyvinylaryl polymerizates are well known. It is also well known that water insoluble sulfonated derivatives of polyvinylaryl compounds are very effective in removing cations from liquid media. These sulfonated derivatives, however, are characterized by the property that where two types of cations such as sodium and potassium are both present they will remove a larger proportion of the potassium ions than the sodium ions. This characteristic is particularly undesirable where such ion exchange bodies are used for medicinal purposes because the ion exchange material when taken internally tends to deplete the potassium rather than the sodium which it is desired to remove.

One of the objects of the present invention is to provide a new and improved synthetic polymeric composition which has active ion exchange properties and exhibits a selectivity for sodium over potassium.

Another object of the invention is to provide new and useful polymeric compositions which are water insoluble and relatively stable in aqueous solutions.

Still a further object of the invention is to provide a new and improved method for preparing such polymeric compositions. Other objects will appear hereinafter.

In accordance with the invention it has been found that phosphonous and phosphonic groups can be introduced into polyvinylaryl compounds and that the resultant compounds are very effective in removing cations from liquid media. Furthermore, it has been found that the resultant water insoluble phosphonous and phosphonic polyvinylaryl compounds show a preference for the removal of sodium over potassium where both ions are present in the same medium.

The polymerizates of polyvinylaryl compounds which are treated in accordance with the invention to produce phosphonous and phosphonic derivatives can be prepared by any suitable method. For example, a polyvinylaryl compound may be polymerized alone or with other polymerizable compounds in the presence or absence of a solvent or a dispersion medium for the monomer or monomers by the use of heat, light or heat and light in the presence or absence of a polymerization catalyst at atmospheric, sub-atmospheric or superatmospheric pressures.

Suitable catalysts are the peroxides, e.g., benzoyl peroxide, hydrogen peroxide, sodium peroxide, acetyl benzoyl peroxide; the per-compounds, e.g., ammonium persulfate, sodium persulfate, sodium perchlorate, sodium perborate, potassium persulfate; ozone; ozonides, and other oxygen supplying catalysts.

After the polymerization of the polyvinylaryl compounds is complete the product can be isolated if a solvent or dispersion medium is used and ground to a granular form. It is preferable, however, to produce the initial polymerizate in the form of beads and to maintain this form as much as possible in the subsequent treatment used to introduce a phosphonous or phosphonic group.

The phosphonous and the phosphonic groups are the active cation removing groups in the polymerizates prepared in accordance with the invention. These groups are introduced into an aryl nucleus of the polymerizate and therefore it is preferable that the major proportion of the polymerizate be made from polymerizable components that contain an aryl nucleus. Thus, the polymerizate may be made by polymerizing a polyvinylaryl compound alone, copolymerizing a plurality of polyvinylaryl compounds, copolymerizing at least one polyvinylaryl compound with at least one monovinylaryl compound, copolymerizing a mixture of polymerizable compounds, the major proportion of the polymerizable compounds being, either at least one polyvinylaryl compound or at least one polyvinylaryl compound and at least one monovinylaryl compound Illustrative examples of suitable polyvinylaryl compounds which may be used are: divinyl benzenes, divinylethyl benzenes, divinylchlorobenzenes, divinyl toluenes, divinyl xylenes, divinylphenylvinyl ethers and divinyl naphthalenes.

Illustrative examples of suitable monovinylaryl compounds which may be used are: styrene, vinyl toluenes, vinylethyl benzenes, vinylchlorobenzenes, alpha methyl styrene, vinyl xylenes and vinyl naphthalenes.

In the practice of the present invention the phosphonous group has been introduced into the aryl nucleus of the polyvinylaryl polymerizate by reacting said polymerizate with phosphorous trichloride with or without a solvent in the presence of a catalyst which will catalyze a Friedel-Crafts reaction, for example, aluminum chloride, hydrogen fluoride, boron trifluoride and stannic chloride.

Any suitable solvent may be used in carrying out the reaction with the phosphorous trichloride, for example, carbon tetrachloride, tetrachloroethane, dichlorobenzene, and other polychloro hydrocarbons.

The product which is obtained after treatment with the phosphorous trichloride can be hydrolyzed to produce a water insoluble phosphonous polyvinylaryl polymerizate which is a cation exchange resin.

A water insoluble phosphonic polyvinylaryl polymerizate can be produced by oxidizing the phosphorus in the phosphonous resin from the trivalent to the pentavalent stage. This can be accomplished by treating the phosphonous resin with chlorine, air, ozone, nitric acid, and other oxidizing agents.

The introduction of phosphorus into the aryl nucleus of the polyvinylaryl polymerizate causes the nucleus to swell rapidly thereby producing breakage of the beads when the polymerizate is in the form of beads. Such breakage is undesirable for the purpose of the invention and it has been found that the breakage can be avoided substantially by pretreating the beads of the polyvinylaryl polymerizate with a swelling solvent which acts to swell such beads without breaking them. Examples of suitable swelling solvents are trichloroethane, trichloroethylene and perchloroethylene. It is preferable to allow the beads to swell for a period of 24 hours at room temperature or, if time is a factor, to accelerate the swelling by heating the beads in the presence of such a solvent at a temperature of 50° C. to 60° C. for a period of two to three hours.

Although it is not absolutely essential to use a solvent to swell the beads before introducing the phosphonous or phosphonic group, if such a solvent is used it may be allowed to remain in the phosphonous resin during its subsequent oxidation to the phosphonic resin.

The invention will be further illustrated but is not limited by the following examples in which the quantities are stated in parts by weight unless otherwise indicated.

EXAMPLE I

A. A polymer is prepared from styrene and divinylbenzene by mixing together 80 parts styrene and 20 parts of divinylbenzene (8 parts pure divinylbenzene), dissolving therein 1 part of benzoyl peroxide, adding the resultant mixture to 800 parts of water in a vessel equipped with a reflux condenser and a sealed stirrer and immersing the said vessel in a constant temperature bath at 90° C. The speed of the stirrer is adjusted to produce beads of the desired size (e.g., 0.3–0.5 mm.). The greater the speed of the stirrer the smaller will be the droplets or beads. After 10 minutes 10 parts of soluble starch powder is added, stirring is continued for at least 3 hours and heat for 20 to 24 hours at the end of which time the beads of the copolymer are collected, washed with water and dried.

B. 208 parts of the polymerizate produced as described under A are placed in a vessel equipped with a stirrer and condenser and there are added 696 parts of $PCl_3$ and 200 parts of anhydrous $AlCl_3$. The mixture is stirred vigorously and is refluxed on a steam bath at a temperature around 90° C. for 52 hours. The excess $PCl_3$ is distilled off and the beads are poured slowly into a mixture of ice and hydrochloric acid. The beads are washed several times with water, then treated alternately with dilute hydrochloric acid and sodium hydroxide solutions.

EXAMPLE II

To 125 parts of dried polystyrene-divinylbenzene beads prepared as described under A in a container equipped with a reflux condenser and stirrer there are added 450 parts $PCl_3$ and 110 parts of $AlCl_3$. The mixture is stirred vigorously and reacted on the steam bath for 24 hours. The excess $PCl_3$ is distilled off and 300 parts of carbon tetrachloride are added to the beads. Chlorine is added until the carbon tetrachloride is saturated with respect to chlorine and the beads are filtered. The beads are then added slowly to a mixture of ice and hydrochloric acid, washed several times with water, then treated alternately with dilute hydrochloric acid and sodium hydroxide solutions.

EXAMPLE III 110 parts of the dried polystyrene-divinylbenzene beads prepared as described in A and 300 parts of tetrachloroethane are placed in a vessel equipped with a stirrer and reflux condenser. The beads are allowed to swell for about 24 hours. Then 412 parts of $PCl_3$ and 133 parts of $AlCl_3$ are stirred in and the mixture is reacted on a steam bath for 6 hours giving dark red beads which lose their swollen state. The excess $PCl_3$ is distilled off. Chlorine gas is bubbled through the resultant solution until no further chlorine is adsorbed. The beads are filtered and are added slowly to a mixture of ice and hydrochloric acid. The beads are washed several times with water, then alternately washed with dilute hydrochloric acid and sodium hydroxide solutions.

EXAMPLE IV

This example illustrates the preparation of mixed potassium and ammonium salts of phosphonous and phosphonic resins of the type described in Examples I, II and III.

To prepare a salt containing 75% of the cation in the ammonium form and 25% in the potassium form the procedure is as follows:

75% of any of the resins produced as described in Examples I, II and III is placed in a column and 25 ml. per dry gram of resin of 1 M ammonium hydroxide is passed through the bed for a period of from 4 to 6 hours. The bed is washed with distilled water at a rapid rate (10 gallons per minute per cubic foot) for 5 minutes or until the hydroxide concentration of the effluent appears to approach a minimum value. The resin is washed sufficiently rapidly to avoid hydrolysis of the ammonium resin.

The remaining 25% of the resin is treated with 1 M sodium hydroxide in the same manner. The two separate resin portions are then mixed thoroughly, are allowed to air dry to the desired moisture content and are now ready for use. Mixed salts of the acid resins of this type are especially suitable for use in the treatment of edema and other phyiscal conditions and ailments where it is desired to use the ion exchange material internally to deplete the sodium content of the body.

The resins prepared in accordance with the examples can have one or more of the following basic structures:

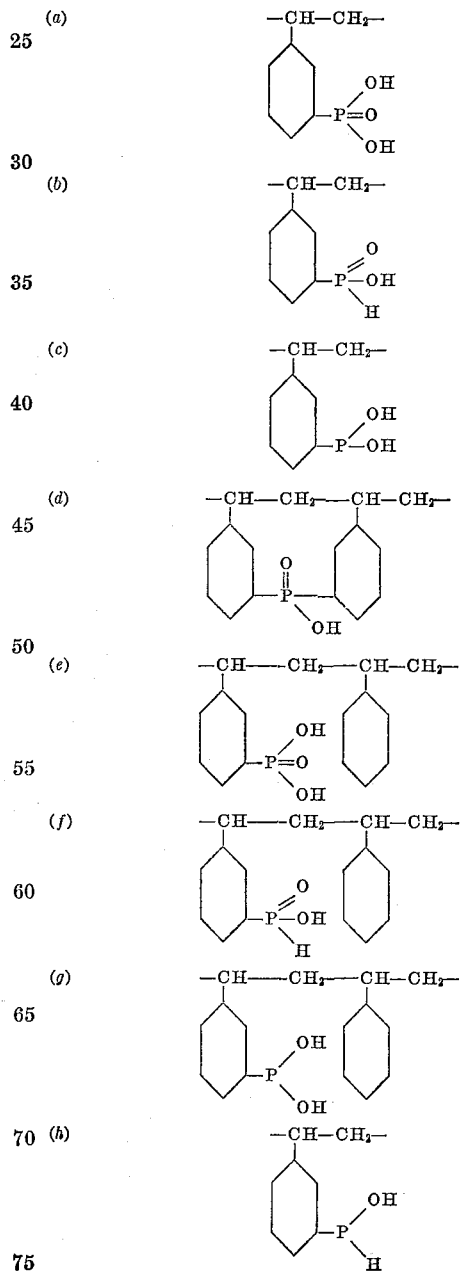

(i) 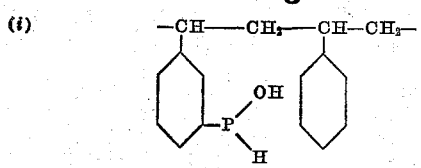

In all of these structures the position of the phosphorus atom has arbitrarily been placed meta to the carbon chain. It may, however, be in the ortho or para positions.

By taking the equivalent weights of these structures and correcting for 8% divinylbenzene, as shown below, the theoretical capacities and percent phosphorus for each postulated structure as indicated in Table I can be determined.

Resin structure "B"
Equivalent weight=168
Equivalent weight of structure when cross-linking due to divinylbenzene is added=182
Mean equivalent weight=$(0.92 \times 168)+(0.08 \times 182)$=169
Theoretical capacity=1000/169=5.9 milliequivalents per gram
Percent phosphorus=31/169=18.3

Table I

THEORETICAL CAPACITIES AND PHOSPHORUS CONTENTS OF RESIN STRUCTURES

| Structure | Theoretical Cap., meq./gm. | Percent Phosphorus |
|---|---|---|
| (a) | 10.8 | 16.7 |
| (b) | 5.9 | 18.3 |
| (c) | 5.9 | 18.3 |
| (d) | 3.7 | 11.4 |
| (e) | 6.9 | 10.6 |
| (f) | 3.7 | 11.3 |
| (g) | 3.7 | 11.3 |
| (h) | 6.5 | 20.3 |
| (i) | 3.9 | 12.1 |

It should be emphasized that the structures leading to the results given in Table I (especially the ones having a phosphorus atom on every other benzene ring) represent a statistical average. The resin is not necessarily homogeneous and various portions of it may contain phosphorus atoms on every ring, every other ring, every third ring, or perhaps even two phosphorus atoms per benzene ring. There may also be phosphorus present which is not part of an exchange group.

The phosphorus and aluminum contents of the resins prepared as described in Examples I, II and III were determined. The resin described in Example I was found to have an average phosphorus content of about 11.0% and an average aluminum content of 0.08%. The resin described in Example II was found to have an average phosphorus content of 11.1% and an average aluminum content of 0.79%. The resin described in Example III was found to have a phosphorus content between 13.6% and 13.8% and an average aluminum content of 0.18%. Data used in plotting the curves appearing in the drawing was obtained in the following manner.

The theoretical capacities of the resins were determined as follows: a three gram sample of the 20–50 mesh fraction of the resin (hydrogen form) was weighed out into a 250 ml. Erlenmeyer flask. Two hundred ml. of 0.15 N-NaOH was then added, and the mixture allowed to equilibrate with occasional shaking for four days. An aliquot of the supernatant liquid was then withdrawn and titrated with standard hydrochloric acid to determine the amount of hydroxyl ion neutralized by the exchanging hydrogen ion. This capacity determination was carried out in triplicate.

One gram samples of the 20–50 mesh hydrogen resin were weighed out into fifteen 250 ml. Erlenmeyer flasks. Two hundred ml. of 4% NaCl was then added to each flask. Varying amounts of standard base were then added, and the mixtures allowed to stand with occasional shaking for four days. The resin was then filtered off and the pH of the solution measured and plotted against the amount of standard base added to the resin. This procedure corresponds to a direct titration of the resin and has the advantage that sufficient time for equilibrium is allowed for each addition of base.

Table II

The theoretical capacities of the phosphonous and phosphonic resins were:

| Resin: | Theoretical capacity, meq./gm. |
|---|---|
| Example I | 2.60 |
| Example II | 5.05 |
| Example III | 4.84 |

The single figure in the drawing shows the titration curves for these resins.

It was noted that the resins of Examples II and III showed a very pronounced reversible color change going from light yellow in the hydrogen state to dark brown in the sodium state. These resins also showed a volume expansion of about 50% on going from the hydrogen state to the sodium state. The resin of Example I contained much aluminum that had to be removed prior to the resin characterization.

From the foregoing theoretical considerations and actual determinations the resin of Example I may be represented by either structure (d), (f) or (i). The resin of Example II may be represented by structure (e).

The resin of Example I is a phosphonous resin and is a monovalent acid. The resin of Example II is a phosphonic resin and is a divalent acid.

The resin of Example III does not correspond to any of the structures, probably due to the incorporation into resin structure (e) of an additional amount of phosphorus to which no exchangeable cation is attached.

The small amount of aluminum which is present appears to be bound to the resin in a manner other that of an exchangeable ion because the conditioning of these resins was such that any aluminum present as the exchangeable cation would have been removed.

The general method of preparation of polystyrene-divinylbenzene phosphonous and phosphonic acid resins may be represented by the following probable reactions:

(1) Phosphonous acid—

Step "A":

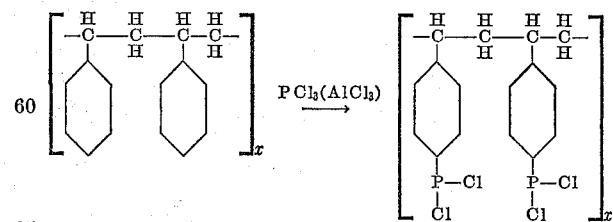

Step "B":

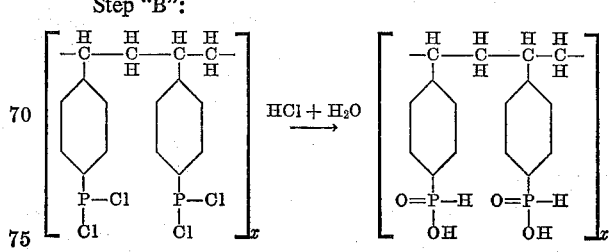

or:

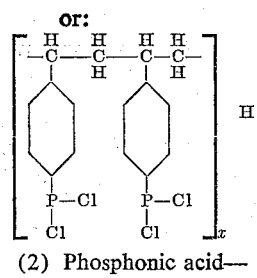 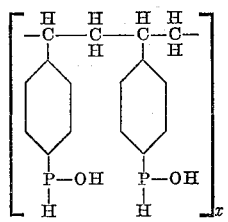

(2) Phosphonic acid—

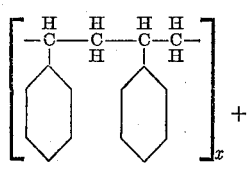 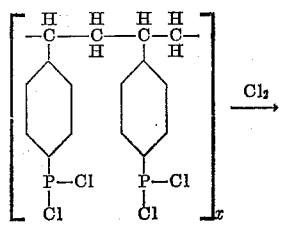

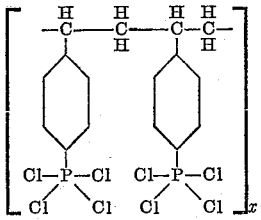 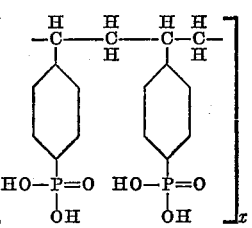

From a consideration of the foregoing examples and equations it will be apparent that in Example I the polystyrene-divinylbenzene dichlorophosphine was hydrolyzed directly. In Examples II and III the polystyrene-divinylbenzene dichlorophosphines were chlorinated in carbon tetrachloride and tetrachloroethane, respectively, and then hydrolyzed.

Although the invention contemplates the preparation of both phosphonous and phosphonic acid resins it will be recognized that the phosphonic acid resins are preferred for most practical purposes because of their higher capacities. These resins being divalent have a greater capacity than the monovalent phosphonous resins.

All of the resins of the present invention in their hydrogen form are water insoluble, infusible, highly cross-linked, phosphonous (phosphinated) or phosphonic (phosphonated) polyvinylaryl polymerizates in which the —OH groups attached to the phosphorus atoms are capable of reacting with cations, for example, sodium ions, calcium ions, magnesium ions, lead ions, potassium ions, iron ions, silver ions, etc., to form salts which are also insoluble and infusible. Hence these resins when brought into contact with solutions containing such cations effectively remove the cations from the solutions. After the resin has adsorbed the cations it can readily be regenerated, for example, by washing with a dilute acid (e.g., 1 N hydrochloric acid), preferably a mineral acid which forms soluble salts with the adsorbed cations. Where the resins are used to abstract bivalent ions such as calcium and magnesium from a fluid medium they can be regenerated to the sodium form of the resin with very dilute sodium hydroxide (0.1 N) or to the ammonium form of the resin with ammonium hydroxide. Combinations of regenerating solutions can be used to produce mixed salts of the resins, for example, mixed ammonium and potassium salts.

The resins described in Examples II and III both would show selectivity uptake of sodium over potassium, the resin of Example II exhibiting this preference to a greater extent. This is an important property of these resins because the water insoluble sulfonated polymerizates of styrene and divinylbenzene which are available commercially exhibit a preference for potassium over sodium. So far as is known, the resins herein described are the first to be discovered which selectively adsorb sodium rather than potassium in a medium containing both ions.

In the examples, the divinylbenzene employed is a mixture containing approximately 40% of divinylbenzene isomers, 45% of ethylbenzene isomers, 15% of diethylbenzene and other known polymerizable material with tertiary butylcatechol as an inhibitor. The crude divinylbenzene is washed three times with equal volumes of 5% sodium hydroxide and three times with distilled water, then dried over anhydrous potassium carbonate and stored at 0° C. over nitrogen. Before each polymerization mixture is made up a sample of each monomer is added to methanol and used only if no precipitation or cloudiness forms. Crude divinylbenzene is used because of its ready availability but it will be understood that pure divinylbenzene can also be used.

Although in the examples the phosphonous or phosphonic polymerizates are prepared from a product obtained by polymerizing a mixture containing 8% of a polyvinylaryl compound and 92% of a monovinylaryl compound it will be understood by those skilled in the art that other proportions may be used in preparing the polymerizate to which the phosphonous or phosphonic crude is to be added, e.g., from 0% to 36% of at least one polyvinylaryl compound and from 100% to 64% of at least one monovinylaryl compound. Good results have been obtained by preparing phosphonous and phosphonic-styrene-divinylbenzene resins containing 4% and 8%, respectively, of divinylbenzene. In general, it is desirable that the proportion of divinylbenzene should not exceed 36% by weight because the molecule becomes so highly cross-linked as to render the introduction of the phosphonous group into the aryl nucleus difficult.

It will be apparent that the invention is susceptible to some variation and modification particularly with respect to the method by which the products can be formed. The best results have been obtained by using a phosphorus halide such as phosphorous trichloride in order to introduce a —PCl$_2$ group into the aryl nucleus. Other phosphorus halides such as phosphorus pentachloride can be used in order to introduce a —PCl$_4$ group into the aryl nucleus. Other reactive halides such as phosphorus bromides can also be employed. The phosphorus polyhalides which were found to be effective were characterized by having all of their halogen atoms linked directly to phosphorus.

The oxidation with chlorine is preferably effected at low temperatures, e.g., around 0° C. to avoid decomposition.

In the hydrolysis step the hydrolyzing agent, for example a dilute hydrochloric acid solution, causes the introduction of at least one —OH group to replace the halogen atoms attached to the phosphorus atom which in turn is linked to the aryl nucleus. In the cation exchange the —OH group is converted to an —OX group where X is a metal ion or the ammonium ion.

The phosphonous resins are monobasic acids with one exchangeable hydrogen ion. The phosphonic resins are dibasic acids with two exchangeable hydrogen ions.

The invention is hereby claimed as follows:

1. A water insoluble phosphonated polymerizate of a mixture comprising a polyvinylaryl hydrocarbon compound and a monovinylaryl hydrocarbon compound.

2. A water insoluble phosphonated polymerizate of a mixture comprising divinylbenzene and styrene.

3. The method of preparing a water insoluble polymerizate of a polyvinylaryl compound containing a phosphorus atom linked to an aryl hydrocarbon nucleus and to an ionizable group which comprises treating a water insoluble polyvinylaryl hydrocarbon polymerizate with phosphorous trichloride in the presence of a Friedel-Crafts catalyst, oxidizing the resultant product with a chemical oxidizing agent from the group consisting of chlorine, air and nitric acid to convert the trivalent phosphorus to pentavalent phosphorus and hydrolyzing the chlorine atoms attached to the phosphorus atoms of the resultant product.

4. The method of preparing a water insoluble polymerizate of a polyvinylaryl compound containing a phosphorus atom linked to an aryl nucleus and to an ionizable group which comprises treating a water insoluble copolymer of styrene and divinylbenzene with phosphorous trichloride in the presence of aluminum chloride, oxidizing the resultant product with chlorine to convert the trivalent phosphorous to pentavalent phosphorus, and then hydrolyzing the resultant product with a hydrolyzing agent from the group consisting of dilute inorganic acids and bases.

5. The method of preparing a water insoluble polymerizate of a polyvinylaryl compound containing a phosphorus atom linked to an aryl nucleus and to an ionizable group which comprises treating a water insoluble copolymer of styrene and divinylbenzene with phosphorous trichloride in the presence of aluminum chloride, oxidizing the resultant product with chlorine to convert the trivalent phosphorus to pentavalent phosphorus in the presence of carbon tetrachloride, and then hydrolyzing the resultant product with a hydrolyzing agent from the group consisting of dilute inorganic acids and bases.

6. The method of preparing a water insoluble polymerizate of a polyvinylaryl compound containing a phosphorus atom linked to an aryl nucleus and to an ionizable group which comprises treating a water insoluble copolymer of styrene and divinylbenzene with phosphorous trichloride in the presence of aluminum chloride, oxidizing the resultant product with chlorine to convert the trivalent phosphorus to pentavalent phosphorus in the presence of tetrachloroethane, and then hydrolyzing the resultant product with a hydrolyzing agent from the group consisting of dilute inorganic acids and bases.

7. A water insoluble phosphonated styrene-divinylbenzene copolymer of about 8% by weight divinylbenzene and 92% by weight styrene containing at least 11.0% by weight of phosphorus.

8. The method of preparing a phosphonated copolymer of styrene and divinylbenzene which comprises treating a water insoluble copolymer of styrene and at least 4% but not more than 36% by weight of divinylbenzene with phosphorous trichloride in the presence of aluminum chloride, oxidizing the resultant product with a chemical oxidizing agent from the group consisting of chlorine, air and nitric acid to convert the trivalent phosphorus to pentavalent phosphorus and then hydrolyzing the chlorine atoms attached to the phosphorus atoms of the resultant product.

References Cited in the file of this patent
UNITED STATES PATENTS

| | | |
|---|---|---|
| 2,416,060 | McAlevy | Feb. 18, 1947 |
| 2,500,149 | Boyer | Mar. 14, 1950 |

OTHER REFERENCES

"Cation Exchangers," Chemical Engineering, pages 196 and 197 (December 1951).

Kunin et al.: "Ion Exchange Resins," page 54, Wiley (1950). (Copy in Div. 50.)